Patented Sept. 19, 1933

UNITED STATES PATENT OFFICE 1,927,604

1,927,604

METHOD OF REDUCING PHOSPHATES

Henry W. Easterwood, Nashville, Tenn., assignor to Victor Chemical Works, a corporation of Illinois No Drawing. Application February 4, 1932
Serial No. 590,986

4 Claims. (Cl. 23—223)

This invention relates to the reduction of phosphates and more particularly to an improved method of reducing phosphate rock in a furnace of the blast furnace type.

In the normal blast furnace production of phosphorus, one of the difficulties encountered is that the temperature at the top of the stock, or blast furnace charge, is too high, resulting in a tendency of the charge to fuse and stick, thereby preventing an even descent of the stock in the furnace. By the use of my invention, the temperature at the top of the furnace is lowered with the result that this tendency is diminished, by the introduction into the charge of phosphatic material of a minor proportion of calcium sulphate.

Where, as is generally the case, the phosphatic material consists of phosphatic rock, having in general a composition corresponding to tri-calcium phosphate, the introduction of the calcium sulphate is preferably accomplished by the addition of dilute sulphuric acid. In general, it is preferred to add from 0.5% to 3.0% of the acid, calculated on a dry basis. The sulphuric acid reacts with the tri-calcium phosphate, forming calcium sulphate, and presumably mono-calcium phosphate.

Where it is desired to charge the phosphate rock in briquet form into the furnace, the sulphuric acid likewise serves as a binder. In such case the phosphate rock is ground to the desired size and mixed with the desired quantity of comminuted reducing material such as, in general, coal, coke, or other carbonaceous fuel. The dilute sulphuric acid may then be added and the mixture pressed into briquet form and dried. The crystals formed as a result of the reaction of the sulphuric acid and the phosphate rock unite the briquet into a compact, hard mass, which will stand considerable rough handling without breakage. The sulphuric acid, as well as being an exceedingly good binding agent, is comparatively cheap.

Calcium sulphate may, of course, be incorporated directly, in which case, if the briquet is desired, any suitable binder may be used.

After preparation, the phosphatic material, calcium sulphate and reducing material are placed in the furnace, together with such additional reducing material as is necessary, and sufficient silica to provide a slag of normal composition. Upon combustion of the charge, the temperature of the phosphatic material and calcium sulphate is gradually raised until the decomposition temperature of the calcium sulphate is reached. At this point the calcium sulphate apparently reacts with the carbon or other reducing material to form calcium oxide and $SO_2$, the reaction consuming heat and resulting in a lowering of the temperature at the top of the stack. This lowering may be as much as 10 to 30° C., where 1% to 3% sulphuric acid has been added. As a result, fusion of the mass is delayed, allowing the charge to descend lower into the stack before fusing, and thereby preventing to a considerable degree an uneven descent and sticking in the top of the furnace.

The foregoing detailed description has been given for clearness of understanding only, and no unnecessary limitations should be understood therefrom, but the appended claims should be construed as broadly as permissible, in view of the prior art.

I claim:

1. The method of reducing phosphate rock in a blast furnace which comprises intimately mixing the ground natural phosphates with a comminuted reducing medium and a minor proportion of calcium sulphate, the percentage of calcium sulphate being of the order of that required to lower the stack temperature 10 to 30° C. upon its decomposition, supplying additional reducing agent sufficient to reduce substantially all of said phosphates to phosphorus, and reducing substantially all of said phosphates to phosphorus in said blast furnace at high temperatures.

2. The method of reducing phosphorus rock in in blast furnace which comprises supplying to ground natural phosphates and a comminuted reducing medium a minor proportion of calcium sulphate, crystallizing said calcium sulphate to act as a binding medium whereby said phosphates and said reducing medium are formed into briquets, supplying additional reducing agent sufficient to reduce substantially all of said phosphates to phosphorus, and reducing substantially all of said phosphates to phosphorus in said blast furnace at high temperatures.

3. The method as set forth in claim 2 in which the proportion of calcium sulphate is from .5 to 3.5% of the ground natural phosphates and comminuted reducing medium constituting said briquets.

4. The method of reducing phosphate rock which comprises intimately mixing ground natural phosphates with a comminuted reducing medium, adding thereto a minor proportion of dilute sulphuric acid, thereby forming a minor proportion of calcium sulphate, compressing and drying said material into a briquet, said calcium sulphate acting as a binding medium, introducing into a blast furnace said briquet together with additional reducing agent sufficient to reduce substantially all of said phosphate rock to phosphorus, and reducing substantially all of said phosphate rock to phosphorus in said blast furnace.

HENRY W. EASTERWOOD.